United States Patent

Kasao et al.

[11] Patent Number: 5,987,462
[45] Date of Patent: Nov. 16, 1999

[54] PARALLEL DATA BASE RECORD DISTRIBUTION METHOD AND PARALLEL DATA BASE MANAGEMENT SYSTEM

[75] Inventors: Hideaki Kasao; Keisuke Toda, both of Fujisawa; Kota Yamaguchi, Yamato; Kazuo Masai; Kiyomi Hirohata, both of Yokohama, all of Japan

[73] Assignees: Hitachi, Ltd., Tokyo; Hitachi Software Engineering Co., Ltd., Yokohama, both of Japan

[21] Appl. No.: 08/840,643

[22] Filed: Apr. 25, 1997

[30] Foreign Application Priority Data

Apr. 26, 1996 [JP] Japan .................................. 8-106815

[51] Int. Cl.⁶ ................................................ G06F 17/30
[52] U.S. Cl. ................................ 707/10; 707/104; 707/7
[58] Field of Search ....................... 364/200; 395/200.32, 395/477, 725, 441, 457; 707/2, 3, 10, 104, 7

[56] References Cited

U.S. PATENT DOCUMENTS

| | | | |
|---|---|---|---|
| 5,032,987 | 7/1991 | Broder et al. | 364/200 |
| 5,055,999 | 10/1991 | Frank et al. | 364/200 |
| 5,237,691 | 8/1993 | Robinson et al. | 395/700 |
| 5,251,318 | 10/1993 | Nitta et al. | 395/725 |
| 5,301,337 | 4/1994 | Wells et al. | 395/800 |
| 5,493,668 | 2/1996 | Elko et al. | 395/457 |
| 5,515,531 | 5/1996 | Fujiwara et al. | 707/3 |
| 5,544,345 | 8/1996 | Carpenter et al. | 395/477 |
| 5,586,292 | 12/1996 | Yamaguchi | 395/441 |
| 5,655,080 | 8/1997 | Dias et al. | 395/200.32 |
| 5,724,600 | 3/1998 | Ogi | 395/800 |
| 5,727,197 | 3/1998 | Burgess et al. | 707/2 |
| 5,742,806 | 4/1998 | Reiner et al. | 707/10 |

Primary Examiner—Thomas G. Black
Assistant Examiner—Frantz Coby
Attorney, Agent, or Firm—Antonelli, Terry, Stout & Kraus, LLP

[57] ABSTRACT

A parallel data base management system with a data base divided into a plurality of external memory units is disclosed. A control CPU, upon receipt of a request for access to the data base, decides whether the access request is for storing or searching a record. For a record storage request, the control CPU determines an external memory unit to store the record using a hash function. In the case of a record search request, on the other hand, all the external memory units are searched in parallel without using the hash function thereby to obtain the desired record. The hash function is altered upon addition of an external memory unit.

19 Claims, 6 Drawing Sheets

PARALLEL DATA BASE RECORD DISTRIBUTION METHOD AND PARALLEL DATA BASE MANAGEMENT SYSTEM

BACKGROUND OF THE INVENTION

The present invention relates to a parallel data base record distribution method and a parallel data base management system, or more particular to a record distribution method and a management system capable of managing the addition of a database unit in a parallel database management system including a plurality of database units in versatile way.

Conventionally, when a large amount of records are to be distributed equally among a plurality of database units of a parallel database management system, a hash function is used in view of a high level of versatility against the increase in the number of records with a small overhead for distribution. In such a case, the hash function is used for both the preparation and addition of a record and the search of the record. In other words, when a new record which has been prepared is stored in a parallel database, the hash function is used to determine a data base unit to store it in, and when searching for the desired record, the same hash function is used to determine the data base unit having the record stored therein.

The hash function is used in the systems described in JP-A-2-113349, JP-A-4-160475 and JP-A-6-103127, for example.

As described above, the use of the hash function for both the preparation/addition of a record and the record search poses the following problems:

(1) The hash function and the result of the hashing (calculation using the hash function) depend on the actual number of divisions (the number of database units) for the parallel data base management system. Therefore, when a data base unit is added in the parallel data base management system, i.e., when the number of divisions is changed, it is necessary to redistribute the entire record stored so far among the data base units using the new hash function depending on the changed number of divisions. This imposes a great burden and makes an efficient operation of the parallel data base impossible.

(2) Even when a data base unit is added without redistributing (restoring) the record, the record is not stored in the newly-added data base unit, and it is impossible to distribute the record equally among the data base units.

SUMMARY OF THE INVENTION

The present invention has been developed to solve the above-mentioned problem points, and the object of the present invention is to provide a record distribution method and a management system capable of meeting a change in the number of data base divisions in a versatile manner in a parallel data base management system for managing a data base divided among a plurality of data base units.

The above-mentioned object of the invention is achieved by changing the hash function used for storing a record when a data base unit is added in a parallel data base management system for managing a data base divided among a plurality of data base units.

Also, the above-mentioned object of the invention is achieved by a parallel data base management system for managing a data base divided among a plurality of data base units, in which the hash function is used for storing a record and the record is searched/updated without using the hash function.

Further, the above-mentioned object of the present invention is achieved by a parallel data base management system for managing a data base divided among a plurality of data base units, in which a record is stored in an added data base unit in a greater proportion than in other data base data units for a predetermined length of time.

The above-mentioned object may be achieved by a parallel data base management system comprising the function of registering the configuration of an external memory unit for storing a data base in divided portions and referencing and altering the contents of the registered configuration, the function of uniquely determining an external memory unit for storing a record from among the external memory units registered in the data base configuration information register using the hash function as a record value, the function of storing and adding a record in an arbitrary external memory unit constituting the data base, and the function of searching for and updating a record in an arbitrary external memory unit constituting the data base. At the time of preparing and adding a record, the storage position determining function and the record storage and addition function are used to store and add the record, so that all the external memory units constituting the data base are searched concurrently using the record search and update function without using the storage position determining function at the time of record search and update, and at the time of changing the number of divisions of the data base as when a CPU is added, the data are stored mainly in an arbitrary added external memory unit.

Also, the above-mentioned object is achieved by a parallel data base management system having the function of storing the average record increase per unit time in the data base and storing the number of records in the external memory units, and the function of storing the records in an added external memory unit by altering the hash function only during the time proportional to the number of records in the external memory units divided by the average amount of increase in the records when altering the number of data base divisions, and the function of securing, during the subsequent record addition, equal storage of the records that have been found unequal at the time of altering the number of data base divisions.

Further, the above-mentioned object of the invention can be achieved by a parallel data base management system having the function of storing the number of records stored in each of the external memory units and the function of moving records to a newly added external memory unit in a CPU from each of the existing external memory units by the number of records in the existing external memory units before altering the number of data base divisions, divided by an altered number of data base divisions, in order to assure storage of equal records among the external memory units of the system.

DESCRIPTION OF THE PREFERRED EMBODIMENTS

Figure 1:
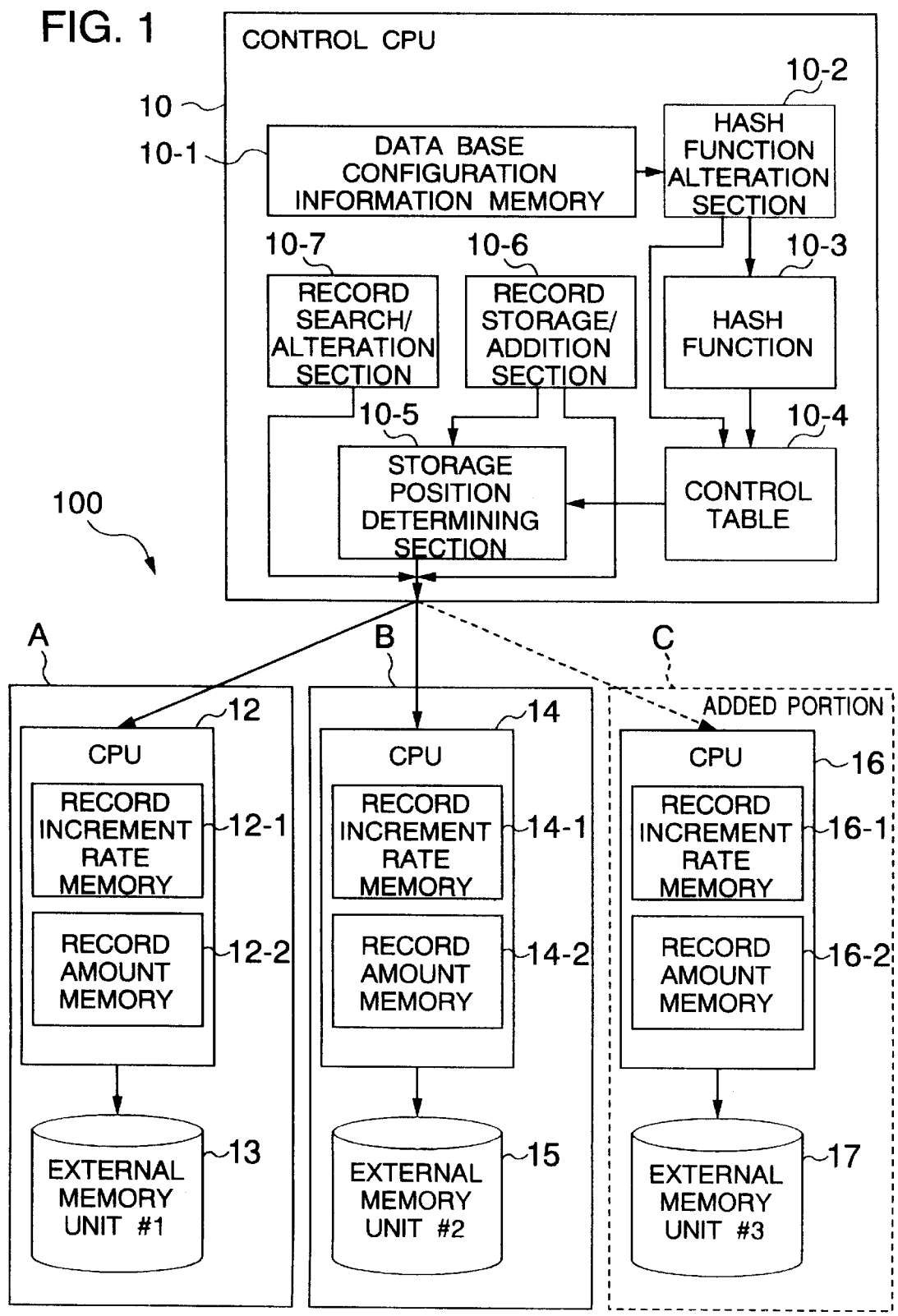
FIG. 1 is a diagram showing a general configuration of a parallel data base management system according to an embodiment of the present invention.

An embodiment of the present invention will be described below with reference to the accompanying drawings. FIG. 1 is a schematic diagram showing a configuration of a parallel data base management system according to an embodiment of the invention.

A parallel data base management system 100 shown in FIG. 1 comprises a plurality of data base units A and B for storing the data base records in divisions, and a central processing unit (CPU) 10 used for control. The control CPU 100 receives a data base access request from an application program, determines an external memory unit of the data base unit to which the access request is destined, and hands over the control to the CPU of the data base unit to which the access request is destined.

The data base unit A includes an external memory unit 13 for storing the record distributed thereto, and a CPU 12 for executing the search and storage of the record stored in the external memory unit 13. In similar fashion, the data base unit B includes an external memory unit 15 for storing the record distributed to the particular data base unit and a CPU 14 for executing the search and storage of the record stored in the external memory unit 15.

The CPUs 12 and 14 include record increment rate memory sections 12-1 and 14-1, and record amount memory sections 12-2 and 14-2, respectively. Each CPU increments the count value stored in the record amount memory section associated therewith each time the record is added to the external memory unit associated therewith. Also, each CPU calculates the record increment rate per unit time in the associated external memory unit and stores it in the associated record increment rate memory section. These counts and record increment rates are used for the processing described below.

The storage and search of the record under normal state of the parallel data base management system 100 shown in FIG. 1 will be described with reference to the flowchart shown in FIG. 2.

Figure 2:
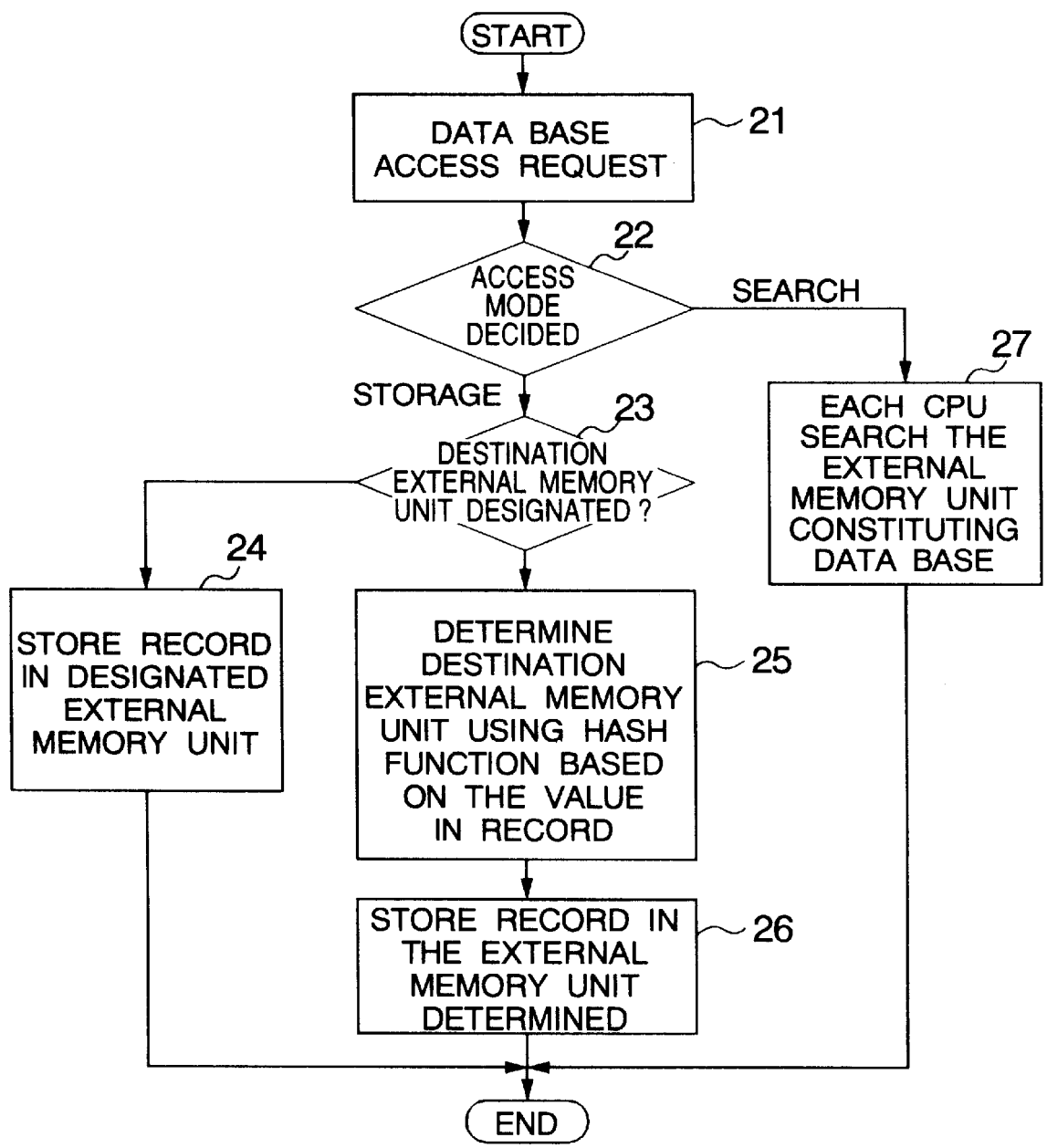
FIG. 2 is a flowchart showing the record search process according to the embodiment shown in FIG. 1.

In FIG. 2, upon receipt of an external access request to the data base for execution of an application program (step 21), the control CPU 10 decides whether the access request is for storage or search of the record (step 22).

When the request is for record storage, the presence or absence of the designation of an external memory unit for storage is determined (step 23). When an external memory unit for storing the record is designated, the particular record is stored in the designated external memory unit (step 24).

When the external memory unit to store the particular record is not designated, the hashing calculation is conducted using the prevailing hash function with the predetermined data portion in the record as an input value. The external memory unit for storing the record is determined from the result of this hashing calculation (step 25). Specifically, the remainders obtained after the result of each hashing calculation is divided by the number of data base divisions (i.e., the number of data base units or the number of the external memory units) is rendered to correspond to the management numbers of the external memory units in advance. The external memory unit for storing the record thus is determined from the value of the remainder. The record is stored in the external memory unit thus determined (step 26).

In the record search, on the other hand, the hash function is not used for determining the external memory unit which stores the record searched for. Specifically, a related external memory unit is searched in each of the data base units A and B. The CPU having an external memory unit having stored therein the record to be searched for responds to the search request and sends the desired record to the control CPU 10 (step 27).

In this way, according to the embodiment of the invention shown in FIG. 1, the function of equally distributing the record based on the hashing calculation result is used only for storing the record.

Now, an explanation will be made regarding the case in which the data base unit C is newly added to the parallel data base management system 100 shown in FIG. 1. In the data base unit C, the CPU 16 and the external memory unit 17 have the functions similar to the other CPUs 12 and 14 and the other external memory units 13 and 15 of the data base units A and B, respectively. Also, in the data base unit C, the record increment rate memory section 16-1 and the record amount memory section 16-2 have the functions equivalent to the other record increment rate memory sections 12-1 and 14-1 and the other record amount memory sections 12-2 and 14-2 of the other data base units A and B, respectively. The operation of the record increment rate memory section and the record amount memory section will be described later.

When the data base unit C is newly added, the information on the configuration of the external memory units in the data base configuration information memory section 10-1 is updated in the control CPU 10. Specifically, the number of database divisions changes from 2 to 3. In the control CPU 10, the hash function alteration section 10-2 changes the hash function 10-3 used for record storage on the basis of the updated system configuration information. It should be noted, however, that the hash function 10-3 is altered on the basis of 4, that is, the result of adding 1 to 3, i.e., the actual number of divisions of the data base. In other words, the hash function is altered such that the record is equally stored in the four external memory units as a result of the CPU 10 conducting the hashing calculation by the altered hash function 10-3.

The hash function alteration section 10-2 also updates the contents of the control table 10-4 based on the hash function 10-3 thus altered.

The record storage position determining section 10-5 sequentially stores the records in the actual three external memory units 13, 15 and 17 based on the contents of the control table 10-4.

In the case of record search, on the other hand, the record search/update section 10-7 of the control CPU 10 instructs each CPU of the data base units A, B and C to search the related external memory units.

The process performed by the control CPU 10 when the data base unit C is added will be explained in more detail with reference to the change in the contents of the control table 10-4 shown in FIGS. 3A to 3D.

Figure 3A:
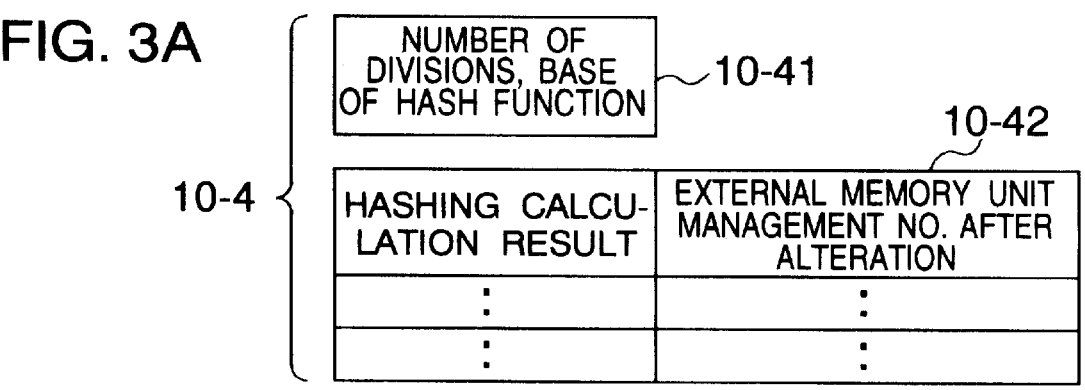
FIGS. 3A and 3D are diagrams showing a change in the contents of a control table when the hash function used in the embodiment of FIG. 1 is altered.

The configuration of the control table 10-4 is shown in FIG. 3A. The control table 10-4 includes a division number storage register 10-41 for storing the number of divisions providing the base of the hash function and a correspondence table 10-42 for storing the management numbers of the external memory units in one-to-one correspondence relation for all the numerical values of the remainders obtained after dividing the hashing calculation result by the number of divisions.

Figure 3B:
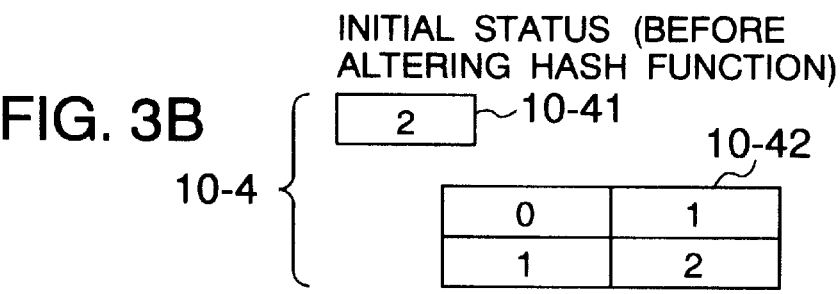

In the parallel data management system shown in FIG. 1, the control table 10-4 initially assumes the status as shown in FIG. 3B. Specifically, the number of divisions on the register 10-41 is 2, in which case the hash function is determined on the basis of the number of divisions which is 2. The remainders after the hashing calculation are 0 and 1. Therefore, in the correspondence table 10-42, the external memory unit 13 of the management number #1 corresponds to the remainder of 0, and the external memory unit 15 of the management number #2 corresponds to the remainder 1.

Figure 3C:
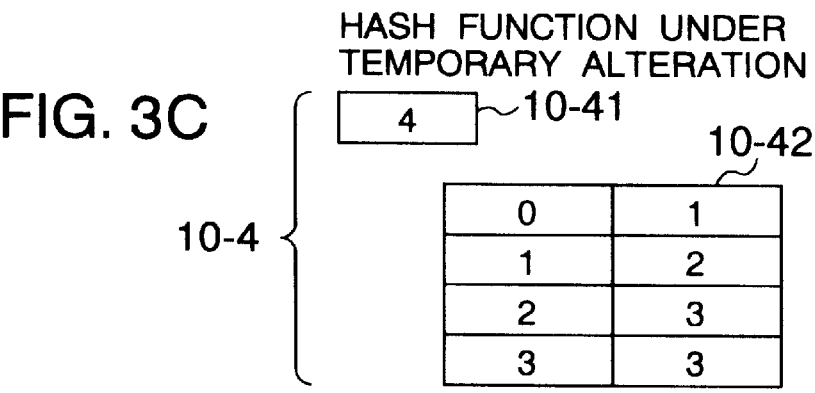

Now, when the data base unit C is added, the control table 10-4 assumes the status as shown in FIG. 3C. Specifically, the register 10-41 has stored therein the temporary number of divisions 4(=3+1). At the same time, the hash function is temporarily altered on the basis of the temporary number of divisions which is 4. The remainders after the hashing calculation are 0, 1, 2 and 3. In the correspondence table 10-42, the external memory unit 13 of the management number #1 corresponds to the remainder 0, the external memory unit 15 of the management number #2 corresponds to the remainder 1, and the external memory unit 17 of the management number #3 corresponds to the remainders 2 and 3. It follows, therefore, that twice as many records are stored in the external memory unit 17 as in the other external memory units 13 and 15.

Figure 3D:
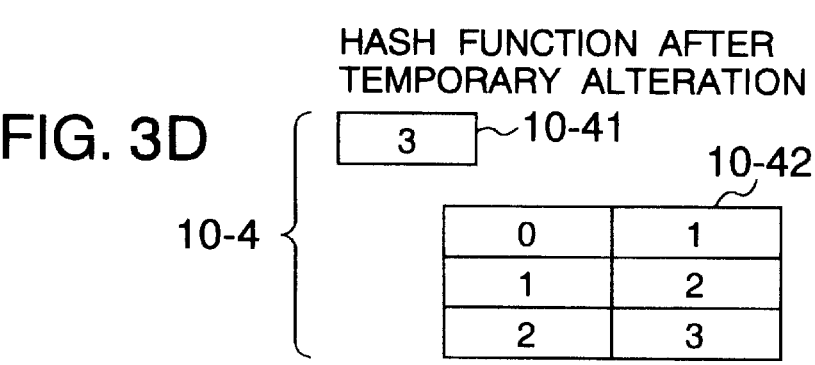

After the lapse of a predetermined length of time, assume that the number of records stored in the external memory units 13, 15 and 17 are substantially equal to each other. The control table 10-4 assumes the status as shown in FIG. 3D. Specifically, the number of divisions on the register 10-41 coincides with the actual number of divisions which is 3. At this time, the hash function is altered again on the basis of the actual number 3 of divisions, and then it remains unaltered until a data base unit is added. The remainders after the hashing calculation are 0, 1 and 2. In the correspondence table 10-42, the external memory unit 13 of the management number #1 corresponds to the remainder 0, the external memory unit 15 of the management number #2 corresponds to the remainder 1, and the external memory unit 17 of the management number #3 corresponds to the remainders 2 and 3. Subsequently, therefore, the records are stored in substantially an equal amount in the external memory units 13, 15 and 17.

Figure 4:
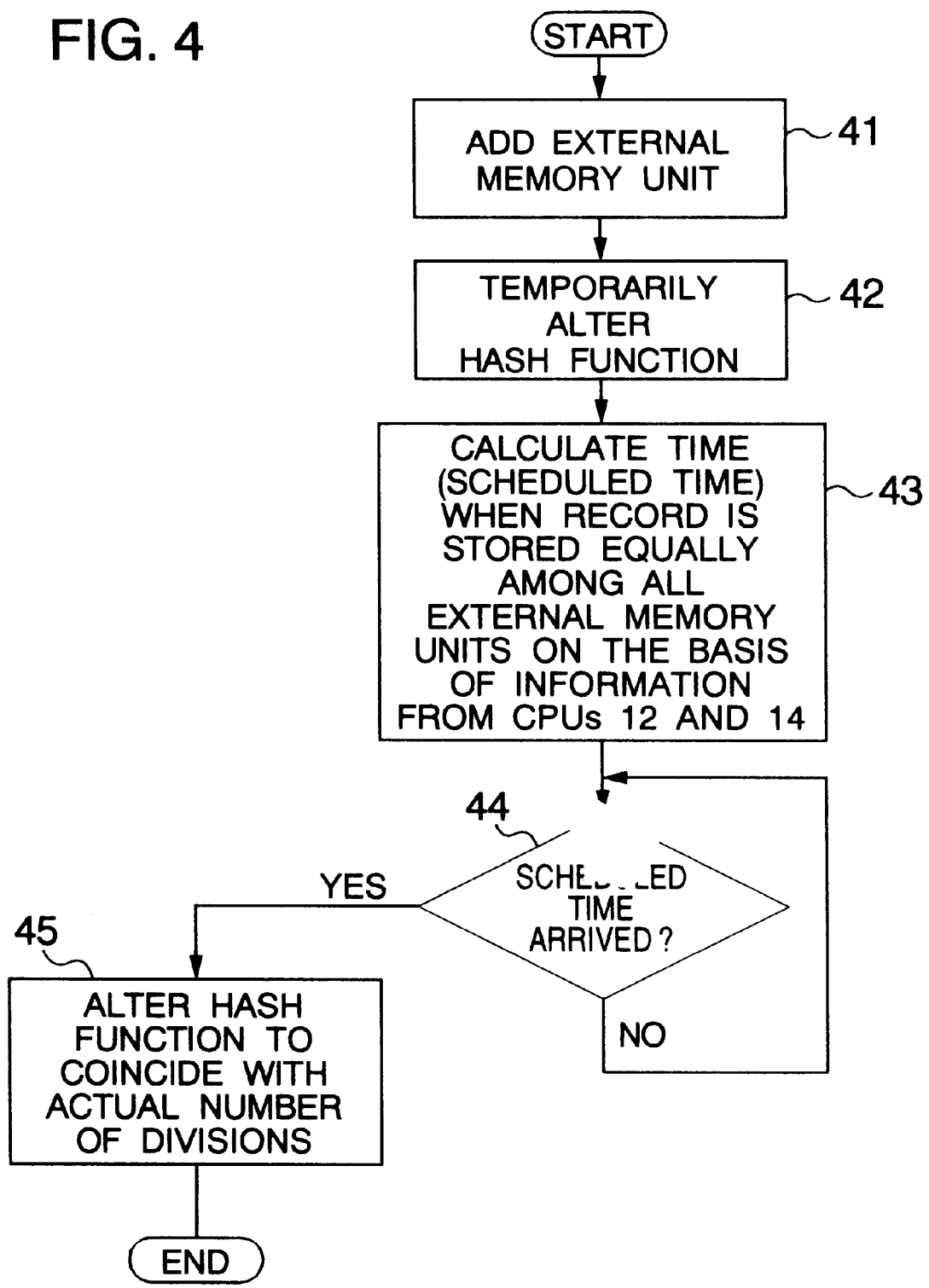
FIG. 4 is a flowchart showing the process of altering the hash function for a predetermined length of time according to the embodiment shown in FIG. 1.
Figure 5A:
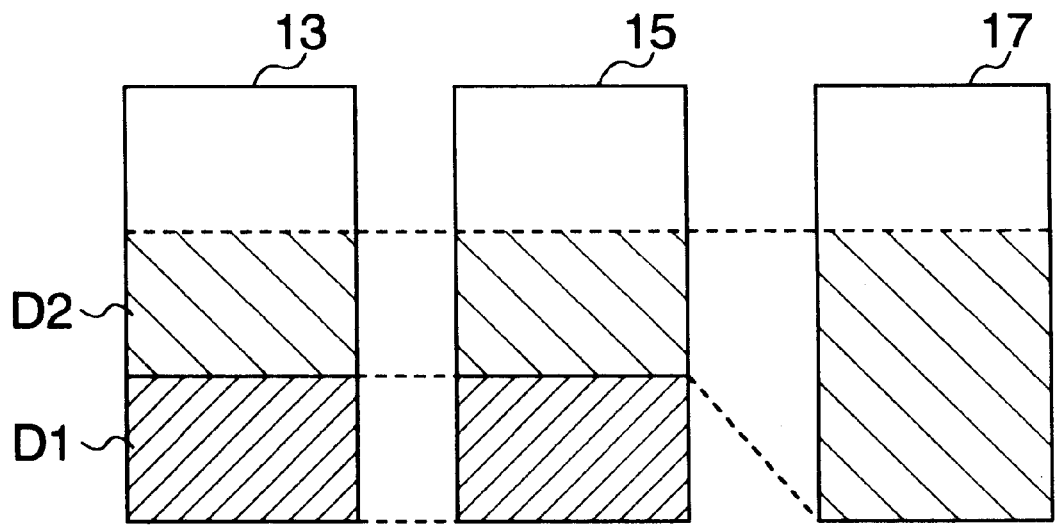
FIGS. 5A and 5B are diagrams schematically showing the storage of records in an external memory unit of each data base unit processed as shown in FIG. 4.

The process of the control CPU 10 shown in FIGS. 3C and 3D will be explained with reference to the flowchart of FIG. 4 and the diagram of FIG. 5A. In FIG. 5A, D1 designates the record already stored before data base unit addition, and D2 the record stored after addition.

With the addition of the external memory unit C (step 41), the hash function 10-3 is temporarily altered (step 42). Then, the control CPU 10 receives the information stored in the record increment rate memory sections 12-1 and 14-1 and the record amount memory sections 12-2 and 14-2 of the CPUs 12 and 14, determines a time length required until the records are stored substantially equally in the external memory units after addition of the external memory unit (FIG. 5A), and calculates a scheduled time when the amount of records becomes substantially equal in the external memory units on the basis of the length of time thus determined (Step 43). The control CPU 10 then monitors whether the scheduled time is reached or not (step 44) and when the scheduled time is reached, alters again the hash function on the basis of the actual number of divisions (step 45).

In step 43, the length of time thus determined indicates a temporary alteration time when the temporary alteration of the hash function is finished after the total amount of records (number of records: D1+D2) in all of the external memory units with the records distributed substantially equally among them after addition of an external memory unit (FIG. 5A) reaches a predetermined multiple of the total amount of records (number of records: D1) stored in all the external memory units before addition. In the embodiment shown in FIG. 5A, the multiple is set to three. The temporary alteration time can be determined as described below.

The difference between the total record amount after addition (D1+D2) and the total record amount before addition (D1) is divided by the average record increment rate per unit time for all the external memory units after addition to determine the temporary alteration time. Theoretically, the record increment rate of each external memory unit coincides with each other, and therefore, the record increment rate for a given external memory unit multiplied by the temporary number of divisions for the temporarily altered hash function (4 in FIG. 3C) may alternatively be used instead of the average record increment rate.

Figure 5B:
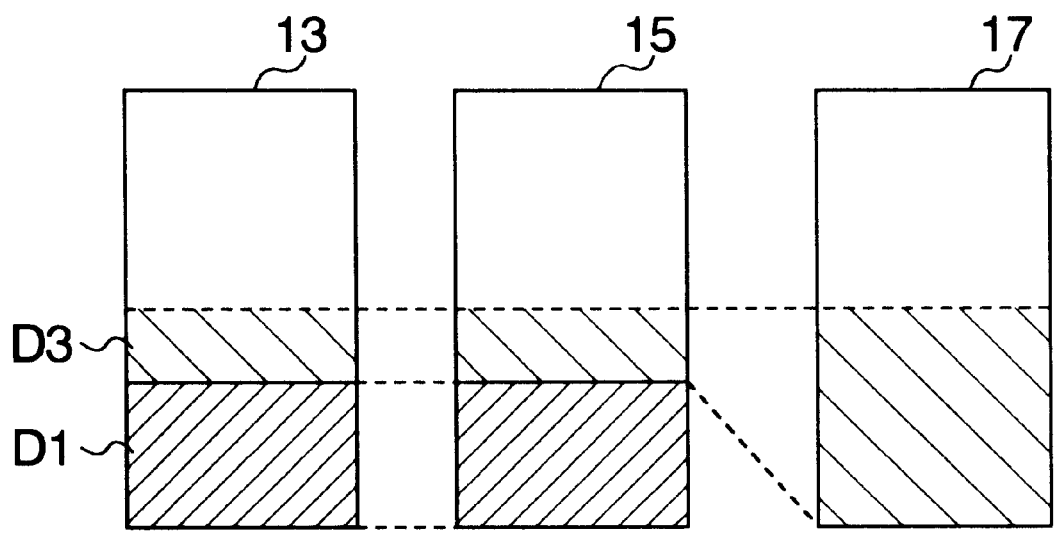

In the above-mentioned example, the temporary number of divisions for the temporarily altered hash function is the actual number of divisions plus 1 (=4). The invention, however, is not limited to this value. FIG. 5B shows the case in which the temporary number of divisions is the actual number of divisions plus 2 (=5). In this case, the hash function is temporarily altered on the basis of the temporary number 5 of divisions. The remainders after the hashing calculation are 0, 1, 2, 3 and 4. In the correspondence table 10-42, the external memory unit 13 of the management number #1 corresponds to the remainder 0, the external memory unit 15 of the management number #3 corresponds to the remainder 1, and the external memory unit 17 of the management number #3 corresponds to the remainders 2, 3 and 4. As a result, the external memory unit 17 can store three times the records as the other external memory units 13 and 15. Under this condition, the temporary alteration of the hash function is finished when the total record amount (D1+D3) in all of the external memory units with the records substantially equally distributed among the external memory units after addition (FIG. 5B) reaches a value equivalent to 9/4 times as large as the total record amount (i.e., the number of records equal to D1 in FIG. 5B, for example) stored in all of the external memory units before addition.

According to the above-mentioned embodiment, the record increment rate of a given database unit is stored in the particular database unit. Alternatively, the average record increment rate per unit time for all of the external memory units may be stored in the control CPU 10.

In the above-mentioned embodiment, the records before addition of a database unit are not moved. Since the hash function is not used for the record search/alteration process as described above, however, a part of the records before addition can be moved to the added database unit at the time of addition of the database unit without adversely affecting the record search/alteration process. Consequently, the temporary alteration time of the hash function can be reduced or eliminated.

Figure 6:
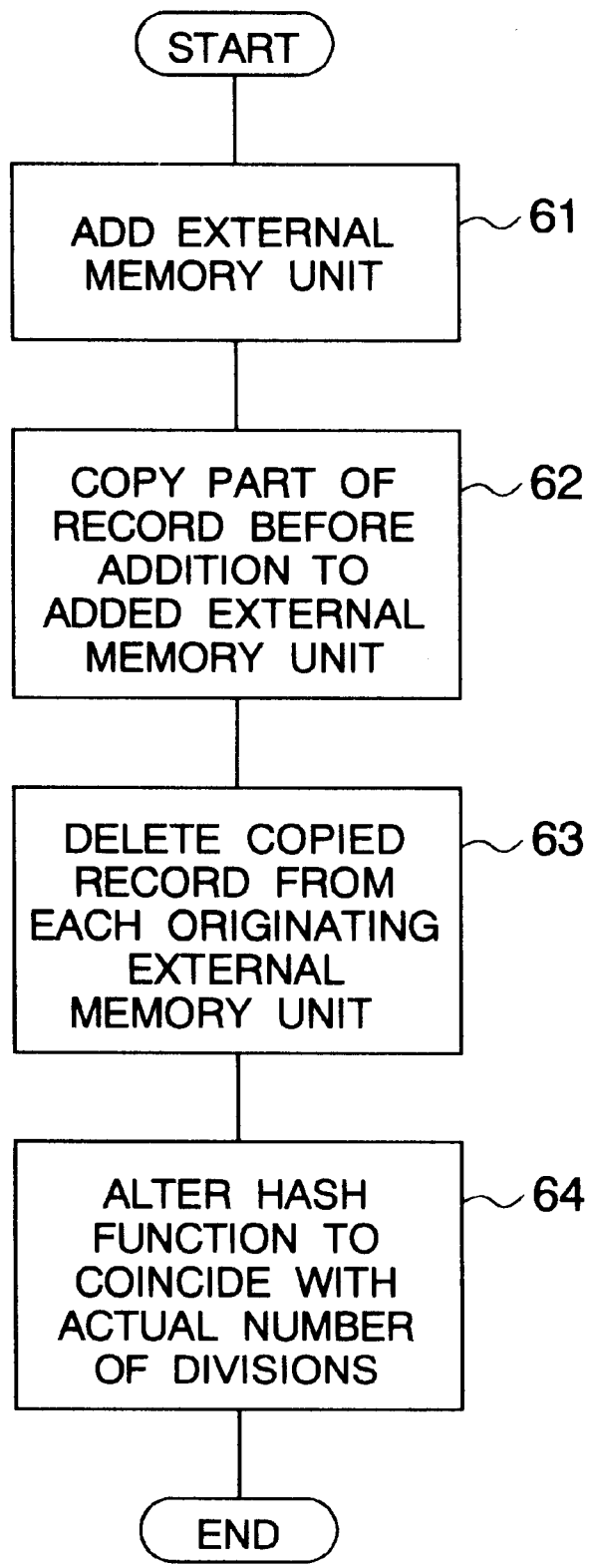
FIG. 6 is a diagram schematically showing the process of moving the records at the time of adding a data base unit.

The process of moving the record before addition shown in FIG. 6 will be explained with reference to the embodiment shown in FIG. 1. When the database unit C is added (step 61), one third of the record amount before addition (D1 of FIG. 5A) is moved to the external memory unit 17 from the external memory units 13 and 15. In this movement, an arbitrary record to be moved from the external memory units 13 and 15 is copied to the external memory unit 17 (step 62), and then the copied record is deleted from the the external memory units 13 and 15 (step 63).

After complete deletion, the hash function is altered to the one conforming to the actual number of divisions (=3) (step 64). This movement process can be efficiently executed by each CPU during an unoccupied time when the record search/storage process is not executed in response to an access request from an application program.

Also, when three or more external memory units are involved, the record stored in one of them is copied or moved to the other external external memory units by the amount of the particular record divided by the number of the remaining external memory units. Then, the hash function is altered so that the record is stored only in the remaining external memory units. In this way, the desired one of the external memory units can be separated from the system without adversely affecting the operation of the parallel database management system.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A method of dividing a database in parallel in a parallel database management system, wherein the database management system comprises:

a plurality of database units each having an external memory unit for storing a division of a database, and a control CPU including means for registering, referencing and altering database configuration information including a number of divisions of the database among said external memory units, means for storing a record in any one of said external memory units, and means for searching and updating the record stored in any one of said external memory units, the database records being distributed among the external memory units associated with each database unit, the stored records being searched and updated in each database unit, thereby achieving a high processing speed;

said method of dividing a database in parallel, comprises the steps of, by said control CPU:

referencing said database configuration information;

calculating the value of a predetermined portion of the data of a record by a hash function;

uniquely determining an external memory unit to store said record to thereby realize the divided storage of the record when storing or adding said record;

searching and updating the external memory units associated with all the database units included in the database to thereby realize the desired record search without using the hash function when searching and updating a record;

said method further comprising the steps of:

storing in memory means an average record increment rate per unit time for the whole database and the number of records in each of said external memory units;

temporarily altering the hash function used for storing the records during a predetermined time proportional to the total number of records in said external memory units before addition divided by the average record increment rate per unit time for all of said external memory units when increasing the number of divisions of the database due to the addition of a database unit; and selecting the added external memory unit in priority over the other external memory units as an external memory unit assigned for storage as a result of the calculation result using the hash function.

2. A method of dividing a database in parallel in a parallel database management system, wherein the database management system comprises:

a plurality of database units each having an external memory unit for storing a division of a database, and a control CPU including means for registering, referencing and altering database configuration information including a number of divisions of the database among said external memory units, means for storing a record in any one of said external memory units, and means for searching and updating the record stored in any one of said external memory units, the database records being distributed among the external memory units associated with each database unit, the stored records being searched and updated in each database unit, thereby achieving a high processing speed;

said method of dividing a database in parallel, comprises the steps of, by said control CPU:

referencing said database configuration information;

calculating the value of a predetermined portion of the data of a record by a hash function;

uniquely determining an external memory unit to store said record to thereby realize the divided storage of the record when storing or adding said record;

searching and updating the external memory units associated with all the database units constituting the database to thereby realize the desired record search without using the hash function when searching and updating a record;

said method further comprising the steps of:

storing the number of records in each of said external memory units in memory means; and moving the records from each of said external memory units before addition to the external memory unit associated with the added database unit by the number stored in each of said external memory units divided by the number of database divisions after addition when adding said database unit and thereby increasing the number of database divisions.

3. A parallel database management system comprising:

a plurality of database units each including an external memory unit for storing a division of a database;

a control CPU including:

means for registering, referencing and altering database configuration information including a number of divisions of the database among said external memory units, storage position determining means for determining an external memory unit to store a record using the hash function for a predetermined portion of the data of each record with reference to said database configuration information, means for storing and adding the record in the external memory unit determined by said storage position determining means, and record search and update means for requesting all of said external memory units included in said database to search and update the records in parallel without using the hash function; and record information storage means for storing the average record increment rate per unit time of the whole database and the number of records in each of said external memory units;

wherein said storage position determining means selects said newly-added external memory unit in priority over the remainder of said external memory units during a predetermined time proportional to the total number of records in said external memory units before addition divided by the average record increment rate per unit time for all of said external memory units when increasing the number of the database divisions due to the addition of said new database unit.

4. A parallel database management system, comprising:

a plurality of database units each including an external memory unit for storing a division of a database; and a control CPU including:

means for registering, referencing and altering database configuration information including a number of divisions of the database among said external memory units, storage position determining means for determining an external memory unit to store a record using the hash function for a predetermined portion of the data of each record with reference to said database configuration information, means for storing and adding the record in the external memory unit determined by said storage position determining means, and record search and update means for requesting all the external memory units constituting the database to search and update the records in parallel without using the hash function, wherein said control CPU further includes:

means for storing the number of records in each of said external memory units, and means for moving the records from each of said external memory units to said newly-added external memory unit by the number stored in each of said external memory units before addition divided by the number of database divisions after addition when increasing the number of the database divisions due to the addition of said database unit.

5. In a parallel data management system comprising a plurality of database units each including an external memory unit for storing a division of a database and a control CPU for determining an external memory unit associated with a destination database unit to store a record using a first hash function in response to a request for storing said record, a method for distributing the record by said control CPU comprising the steps of:

altering said first hash function to a second hash function based on the altered number of database divisions upon detection of said alteration of the number of database divisions;

determining a destination external memory unit to store said record on the basis of the hashing calculation using the prevailing hash function in response to a record storage request and instructing the database unit associated with said destination external memory unit to store said record; and instructing all of said database units to search said record without using the first and second hash functions in response to a record search request.

6. A record distribution method according to claim 5, wherein said alteration of the number of database divisions is increasing the number of database divisions due to the addition of a database unit.

7. A record distribution method according to claim 5, wherein said alteration of the number of database divisions is decreasing the number of divisions due to the separation of a database unit.

8. In a parallel data management system comprising a plurality of database units each including an external memory unit for storing a division of a database and a control CPU for determining an external memory unit associated with a destination database unit to store a record using a first hash function in response to a request for storing said record, a method for distributing the record by said control CPU comprising the steps of:

temporarily altering said first hash function to a second hash function based on a number larger than the altered number of database divisions upon detection of an increase in the number of database divisions due to the addition of a database unit;

determining a destination external memory unit to store said record on the basis of the hashing calculation using said second hash function in response to a record storage request and instructing the database unit associated with said destination external memory unit to store said record;

altering said second hash function to a third hash function based on a number equal to the altered number of database divisions after the lapse of a predetermined length of time following said temporary alteration to said second hash function;

determining a destination external memory unit to store said record on the basis of the hash calculation using said third hash function in response to a record storage request and instructing the database unit associated with said destination external memory unit to store said record; and instructing all of said database units to search said record without using said first, second or third function in response to a record search request.

9. A record distribution method according to claim 8, wherein a difference between the total record amount after addition and the total record amount before addition is divided by the average record increment rate per unit time for all the external memory units after addition thereby to determine said predetermined length of time.

10. A record distribution method according to claim 9, wherein the record increment rate for a given external memory unit before addition is used as the average record increment rate per unit time for all the external memory units after addition.

11. In a parallel data management system comprising a plurality of database units each including an external memory unit for storing a division of a database and a control CPU for determining an external memory unit associated with a destination database unit to store a record using a first hash function in response to a request for storing said record, a method for distributing the record by said control CPU comprising the steps of:

moving a part of the records stored in the external memory units already existing before a database unit addition to an added external memory unit thereby to distribute the records stored before addition equally among the external memory units after database unit addition, upon detection of an increase in the number of said database divisions due to the addition of said database unit;

altering said first hash function to a second hash function based on a number equal to the altered number of divisions after complete movement of said record;

determining a destination external memory unit to store said record on the basis of the hashing calculation using the prevailing hash function in response to a record storage request and instructing the database unit associated with said destination external memory unit to store said record; and instructing all of said database units to search said record without using said first or second hash function in response to a record search request.

12. A parallel database management system, comprising:

a plurality of database units each including an external memory unit for storing a division of a database; and a control CPU for determining a destination external memory unit associated with a database unit to store a record using a first hash function in response to a request for storing the particular record in said database, wherein said control CPU includes:

means for altering said first hash function to a second hash function based on the altered number of database divisions upon detection of the alteration of the number of divisions of said database, means for determining a destination external memory unit to store said record on the basis of the hashing calculation using the prevailing hash function in response to a record storage request and instructing the database unit associated with said destination external memory unit to store said record, and means for instructing all the database units to search said record without using said first or said second hash function in response to a record search request.

13. A parallel database management system according to claim 12, wherein the alteration of said number of database divisions is increasing the number of database divisions due to the addition of a database unit.

14. A parallel database management system according to claim 12, wherein said alteration of said number of database divisions is decreasing the number of database divisions due to the separation of a database unit.

15. A parallel database management system, comprising:

a plurality of database units each including an external memory unit for storing a division of a database; and a control CPU for determining a destination external memory unit associated with a database unit to store a record using a first hash function in response to a request for storing the particular record in said database, wherein said control CPU includes:

means for temporarily altering said first hash function to a second hash function based on a number larger than the altered number of database divisions upon detection of an increase in the number of database divisions due to the addition of a database unit, and altering said second hash function to a third hash function based on the altered number of database divisions after the lapse of a predetermined time following said temporary alteration to said second hash function, means for determining a destination external memory unit to store said record on the basis of the hashing calculation using the prevailing hash function in response to a record storage request and instructing the database unit associated which said destination external memory unit to store said record, and means for instructing all the database units to search said record without using said first, said second or said third hash function in response to a record search request.

16. A parallel database management system according to claim 15, wherein said control CPU calculates a difference between the total record amount after database unit addition and the total record amount before database unit addition, calculates the average record increment rate per unit time for all the external memory units alter database unit addition and dividing said difference by said average record increment rate thereby to determine said predetermined length of time.

17. A parallel database management system according to claim 16, wherein each of said external memory units includes means for storing the record increment rate, and said control CPU uses the record increment rate stored in said memory means as the average increment rate per unit time for all the external memory units after database unit addition.

18. A parallel database management system, comprising:

a plurality of database units each including an external memory unit for storing a division of a database; and a control CPU for determining a destination external memory unit associated with the database unit to store a record using a first hash function in response to a request for storing such a record in said database, wherein said control CPU includes:

means for moving a part of the records stored in the external memory units already existing before addition to an added external memory unit upon detection of an increase in the number of said database divisions due to the addition of a database unit thereby to distribute the records stored before database unit addition equally among the external memory units after addition, means for altering said first hash function to a second hash function based on the altered number of database divisions after complete movement of said record, means for determining a destination external memory unit to store said record on the basis of the hashing calculation using the prevailing hash function in response to a record storage request and instructing the database unit associated with said destination external memory unit to store said record, and means for instructing all the database units to search said record without using said first or second hash function in response to a record search request.

19. A computer program stored on a storage medium in a parallel database management system including a plurality of database units each having an external memory unit for storing a division of a database and a control CPU, said computer program, when executed by said control CPU causes said parallel database management system to perform the steps of:

registering, referencing and altering database configuration information including the number of divisions of the database among said external memory units, determining one of said external memory units to store a record using a hash function for a predetermined portion of the data of each record with reference to said database configuration information, storing and adding the record in the determined external memory unit, requesting all of said external memory units in said database to search and update the records in parallel, and storing an average record increment rate per unit time of the whole database and the number of records in each of said external memory units;

wherein said determining step selects said newly-added external memory unit in priority over the remainder of said external memory units during a predetermined time proportional to the total number of records in said external memory units before addition divided by the average record increment rate per unit time for all said external memory units when increasing the number of database divisions due to the addition of said new database unit.

* * * * *